United States Patent
Krause et al.

(10) Patent No.: US 7,239,396 B2
(45) Date of Patent: Jul. 3, 2007

(54) METHOD AND APPARATUS FOR DIRECTLY MEASURING THE PHASE CHANGE OF AN OPTICAL SIGNAL

(75) Inventors: David J. Krause, Saskatoon (CA); John C. Cartledge, Kingston (CA)

(73) Assignee: Queen's University at Kingston, Kingston, Ontario (CA)

( * ) Notice: Subject to any disclaimer, the term of this patent is extended or adjusted under 35 U.S.C. 154(b) by 363 days.

(21) Appl. No.: 10/942,787

(22) Filed: Sep. 17, 2004

(65) Prior Publication Data
US 2005/0062978 A1    Mar. 24, 2005

Related U.S. Application Data

(60) Provisional application No. 60/503,969, filed on Sep. 19, 2003.

(51) Int. Cl.
*G01B 9/02* (2006.01)
(52) U.S. Cl. .................... 356/477; 356/484
(58) Field of Classification Search ........... 356/35.5, 356/477, 484, 491; 250/227.19, 227.27; 398/187
See application file for complete search history.

(56) References Cited

U.S. PATENT DOCUMENTS

| | | | |
|---|---|---|---|
| 5,696,579 A * | 12/1997 | Johnson | 356/35.5 |
| 5,721,615 A * | 2/1998 | McBride et al. | 356/477 |
| 6,181,429 B1 * | 1/2001 | Barberis et al. | 356/477 |
| 6,407,805 B1 | 6/2002 | Sorin | |
| 6,765,681 B1 | 7/2004 | Sweetser et al. | |
| 6,882,428 B2 * | 4/2005 | Baney et al. | 356/477 |
| 6,980,288 B2 * | 12/2005 | Kido et al. | 356/73.1 |

OTHER PUBLICATIONS

Debeau, J., et al., "Simple method for the complete characterization of an optical pulse." Optics Letters, vol. 23: 1784-1786 (1998).
Devaux, F., et al., "Simple measurement of fiber dispersion and of chirp parameter of intensity modulated light emitter." J. Lightwave Technol., vol. 11: 1937-1940 (1993).
Dorgeuille, F., et al., "On the transmission performances and the chirp parameter of a multiple-quantum-well electroabsorption modulator." IEEE J. Quantum Electron., vol. 30: 2565-2572 (1994).

(Continued)

*Primary Examiner*—Gregory J. Toatley, Jr.
*Assistant Examiner*—Michael A. Lyons
(74) *Attorney, Agent, or Firm*—Stephen J. Scribner; Carol Miernicki Steeg

(57) ABSTRACT

This invention relates to a method and apparatus for measuring the phase change of an output optical signal from a device. In one embodiment an input optical signal is split into first and second optical signals, and the first optical signal is passed through the device while applying an external stimulus to the device, to produce an output optical signal having a phase shift. The carrier frequency of the second optical signal is changed, and the output optical signal and the changed second optical signal are then combined. The combined signal is detected in accordance with the external stimulus applied to the device, and the phase change of the output signal of the device is measured as a function of the external stimulus applied to the device.

21 Claims, 8 Drawing Sheets

OTHER PUBLICATIONS

Dorrer, C., et al., "Simultaneous temporal characterization of telecommunication optical pulses and modulators by use of spectrograms." Optics Letters, vol. 27: 1315-1317 (2002).

Krause, D.J. et al., "Technique for measuring the optical phase transfer function." ECOC, Rimini, Italy (2003).

Krause, D.J., et al., "Technique for measuring the optical phase transfer function." IEEE Photon. Technol. Lett., vol. 16: 1915-1917 (2004).

Krause, D.J., et al., "Quadrature-mixer based receiver for improved measurement of the optical phase transfer function." OFC, Anaheim, California (2005).

Romstad, F.R., et al., "Heterodyne technique for measuring the amplitude and phase transfer functions of an optical modulator." IEEE Photon. Technol. Lett., vol. 14: 621-623 (2002).

Yoshida, S., et al., "InGaAlAs/InAlAs multiquantum well electroabsorption phase modulator module." Electron. Lett., vol. 30: 1795-1796 (1994).

Yu, J., "The beam propagation method and its application to the design of semiconductor modulators." Ph.D. thesis, Queen's University at Kingston, Kingston, ON. Canada (1994) (excerpt).

* cited by examiner

METHOD AND APPARATUS FOR DIRECTLY MEASURING THE PHASE CHANGE OF AN OPTICAL SIGNAL

RELATED APPLICATIONS

This application claims the benefit of the filing date of U.S. Provisional Patent Application No. 60/503,969, filed on Sep. 19, 2003, the contents of which are incorporated herein by reference in their entirety.

FIELD OF THE INVENTION

This invention relates to a method and apparatus for measuring the phase change of an output optical signal from a device. In particular, the invention relates to a method and apparatus for directly measuring the optical phase transfer function of a device as a function of an external signal applied to the device.

BACKGROUND OF THE INVENTION

Many optoelectronic devices used in fields such as optical communications involve changing the phase of an optical signal as a function of an external stimulus. The phase change can be the basis for the device functionality (e.g., Mach-Zehnder modulator, interferometric wavelength converter), or a residual effect such as chirp that is secondary to the device functionality (e.g., electroabsorption modulator). Such residual phase shift is important because of its potential impact on system performance. For the purposes of device design and system performance evaluation, it is important to be able to characterize the change in phase as a function of an external stimulus (optical phase transfer function).

Several methods are known for measuring the phase change of an optical signal as a function of an external stimulus. For example, the required information can be obtained indirectly from two separate measurements: the dependence of the intensity of the optical signal on the external stimulus, and the dependence of the alpha-parameter of the optical signal on the external stimulus (see for example Dorgeuille et al., IEEE J. Quantum Electron., 30:2565–2572, 1994). Alternatively, a balanced lock-in detection technique can be used to measure the amplitude and phase of the interference generated by two ultra short optical pulses (signal from the device under test and the reference signal), as described in Romstad et al., IEEE Photon. Technol. Lett., 14:621–623, 2002. In another technique, a box car averager is used to measure the amplitude and phase of interference signals generated by a bulk optic interferometer with a moving mirror (Yu, J., "The Beam Propagation Method and Its Application to the Design of Semiconductor Modulators," Ph.D. thesis, Queen's University at Kingston, Kingston, Ontario, 1994). Lastly, an interferometer can be used to convert changes in the optical phase to changes in power (see Yoshida et al., Electronics Letters, 30:1795–1796, 1994).

However, such known techniques have limitations including (1) the result of interest is obtained indirectly, (2) the measurement setup is complicated, and (3) the measurement setup uses specialized and expensive equipment that may not necessarily be readily available.

SUMMARY OF THE INVENTION

According to a first aspect of the invention there is provided a method for measuring the phase change of an output optical signal from a device, comprising: splitting an input optical signal into first and second optical signals; passing the first optical signal through the device to produce an output optical signal; applying an external stimulus to the device; changing the carrier frequency of the second optical signal; combining the output optical signal and the changed second optical signal to produce a combined signal; detecting the combined signal in accordance with the external stimulus applied to the device; and measuring the phase change of the output signal of the device as a function of the external stimulus applied to the device.

In one embodiment, said changing the carrier frequency of the second optical signal comprises frequency down-converting the second optical signal. In another embodiment, said changing the carrier frequency of the second optical signal comprises frequency up-converting the second optical signal.

In another embodiment, the method further comprises measuring an amplitude change of the output signal as a function of the external stimulus applied to the device. In various embodiments, the external stimulus is selected from the group consisting of electrical, optical, physical, chemical, and biological stimuli.

In another embodiment, the method further comprises passing at least one of said first and second optical signals through at least one polarization controller. In a preferred embodiment, said applying an external stimulus to the device comprises sweeping said device over its operating range.

According to a second aspect of the invention there is provided an apparatus for measuring the phase change of an output optical signal from a device, comprising: a splitter that splits an input optical signal into first and second optical signals, said first signal being applied to said device; a converter that changes the carrier frequency of the second optical signal; a coupler that combines the output optical signal from the device and the changed second optical signal to produce a combined signal; and an optical receiver that detects the combined signal in accordance with an external stimulus applied to the device and measures the phase change of the output signal of the device as a function of the external stimulus applied to the device.

In one embodiment, the apparatus further comprises an external stimulus source that provides said external stimulus to the device. In various embodiments, the external stimulus is selected from the group consisting of electrical, optical, physical, chemical, and biological stimuli.

In another embodiment, the apparatus further comprises at least one polarization controller associated with at least one of said first and second signals.

In another embodiment, the optical receiver also measures a change in amplitude of the output signal of the device.

In another embodiment, said carrier frequency converter is a carrier frequency down-converter, while in a further embodiment, said carrier frequency converter is a frequency up-converter.

According to a third aspect of the invention there is provided a system for measuring the phase change of an output optical signal from a device comprising the apparatus as described above, and one or more associated components. In one embodiment, the system is an optical communications system comprising the apparatus described above that measures the phase change of an output optical signal from the system or from a device within the system. In various embodiments, the system further comprises at least one member of the group consisting of an optical signal source, a power source, a control device, a data acquisition/processing device, and a display device.

BRIEF DESCRIPTION OF THE DRAWINGS

Embodiments of the invention are described below, by way of example, with reference to the drawings, wherein.

DETAILED DESCRIPTION OF THE INVENTION

Figure 1:
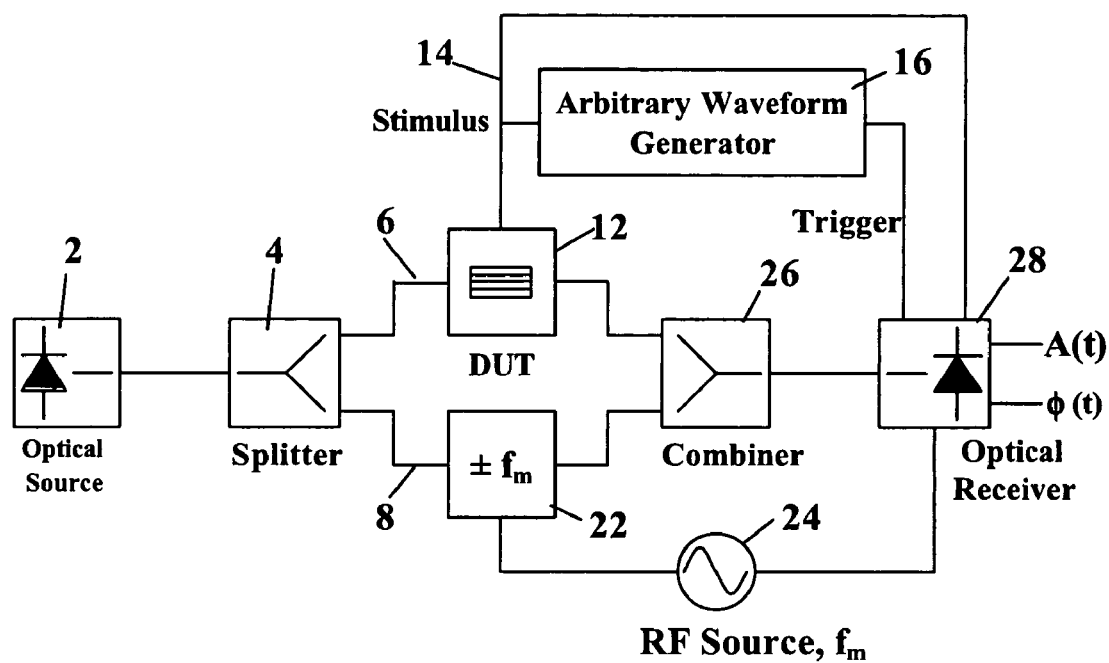
FIG. 1 is a generalized block diagram of an apparatus according the invention.

According to the invention there is provided a method and apparatus for directly measuring the change in phase of the output optical signal from a device as a function of an external stimulus applied to the device. The invention thus provides a method and apparatus for directly measuring the optical phase transfer function of a device. The phase change can be the basis for the device functionality or a residual effect that is secondary to the device functionality.

As known in the art, a sinusoidal signal s(t) can be described using phasor notation:

$$s(t) = Re\{A\exp(j(2\pi f_0 t + \emptyset))\} \quad (1)$$

which can be rewritten in shorthand notation as:

$$s(t) = A\exp(j\emptyset) \quad (2)$$

In equation (1), Re denotes the real part of the quantity in parentheses, $f_0$ is the frequency of the sinusoidal signal (often referred to as the carrier frequency), A is the amplitude, and ø is the phase. This invention relates to measuring a change in the phase ø of the output signal from an optoelectronic device as a function of an external stimulus applied to the device. As used herein, the terms "change in phase", "phase change", and "phase shift" are terms of art and are considered to be equivalent.

As used herein, the terms "external stimulus" and "external signal" are interchangeable and refer to a stimulus applied to a device which produces a phase change in an optical signal passing through the device. The external stimulus can be, for example, optical, electrical, physical, chemical, or biological, or combinations thereof.

The invention can be used to directly measure the optical phase transfer function of any optoelectronic device, system, or equipment whose operation involves the application of an external stimulus, in which the phase of the output optical signal from the device, system, or equipment is a function of the external stimulus applied to the device. As used herein, the terms "device under test" and "DUT" are intended to mean any such device, system, or equipment.

In one embodiment, the invention is applicable to devices for which the external stimulus is an electrical signal. Examples of devices in which the phase change is the basis for the device functionality include, but are not limited to, lithium niobate and multiple quantum well Mach-Zehnder modulators, and lithium niobate phase modulators. An example of a device in which the phase change is a residual effect that is secondary to the device functionality is an electroabsorption modulator.

In another embodiment, the invention is applicable to devices for which the external stimulus is an optical signal. A three-port version of such a device has two input signals (usually one is continuous wave (CW) and one is modulated—often referred to as the "probe" and "pump" signals, respectively) and one output signal (modified version of the input probe signal). Typically, the pump signal effects a change in the probe signal. In many cases, this will involve changing the phase of the probe signal as a function of the pump signal (external stimulus). Examples of devices in which the phase change is the basis for the device functionality include, but are not limited to:

cross-phase modulation in a semiconductor optical amplifier to realize an interferometric wavelength converter, optical regenerator, optically activated switch, or an optically activated gate (demultiplexer);

cross-phase modulation in an electroabsorption waveguide to realize an interferometric wavelength converter; and cross-phase modulation in an optical fiber to realize a wavelength converter, optical regenerator, or optically-activated switch.

Examples of devices in which the phase change is a residual effect that is secondary to the device functionality include, but are not limited to:

cross-gain modulation in a semiconductor optical amplifier; and cross-absorption modulation in an electroabsorption waveguide.

In other embodiments, the invention is applicable to devices for which the external stimulus is a physical stimulus (e.g., temperature or pressure), a chemical stimulus (e.g., pH or concentration), or biological stimulus (e.g., muscle tension, population density in a biological culture). For example, the invention can be used to characterize the phase change of any of the above-mentioned devices in response to such a stimulus.

According to the invention, an input optical signal of a given carrier frequency is split into first and second signals. The first signal is passed through a device, and an external stimulus is applied to the device. The phase of the output signal leaving the device is changed by the external stimulus applied to the device. The second signal is passed through a carrier frequency converter to produce a change in the carrier frequency relative to the first signal. The first and second signals are then combined, and detected by an optical receiver. From the combined signal the optical receiver determines the change in phase of the optical signal as a function of time. Since the external stimulus as a function of time is known, the change in phase of the optical signal as a function of the external stimulus applied to the device can be determined. This is shown schematically in FIG. 1.

Referring to FIG. 1, an input optical signal from a source 2 is split into first and second optical signal paths 6 and 8 by a splitter 4. The signal in the first optical signal path is fed to a device 12 (referred to here as a device under test (DUT)), for example, a modulator. The phase of the optical signal passing through the DUT 12 is changed by an external stimulus 14, for example, an applied voltage (V(t)) from a signal source 16. The intensity of the output optical signal from the DUT 12 may also be changed, and, although this is not essential to the invention, the invention can detect a change in intensity of the optical signal. The signal source 16 may be a waveform generator or any analogue/digital source. To fully characterize the phase change produced by the DUT, it is preferable that the external stimulus sweeps over the operating range of the device. However, under actual operating conditions of the DUT the external stimulus typically does not cover such a broad range. As shown in FIG. 1, the external stimulus is also used to gate the measurement made by the optical receiver 28.

The signal in the second optical signal path 8 is fed to a carrier frequency converter 22, either a carrier frequency down-converter or a carrier frequency up-converter. The carrier frequency converter changes the carrier frequency of the optical signal by a fixed amount which is determined by the frequency $f_m$ of an RF source 24 applied thereto. The term "fixed amount" as used herein refers to an amount which converts the carrier frequency of the optical signal to a frequency which is within the allowable range of the optical receiver. Precisely controlling the frequency of the RF source reduces noise and improves accuracy of the phase change measurement.

It will be appreciated that various techniques are available for implementing the frequency converter 22. For example, the frequency converter may be a Mach-Zehnder modulator (MZM), followed by an optical bandpass filter (OBPF). Preferably, the frequency converter is biased at the extinction point, i.e., the point at which the strength of the upper and lower sidebands of the resulting modulated signal is maximized. The OBPF selects either the upper or lower sideband depending on whether up-conversion or down-conversion is desired.

As shown in FIG. 1, the output optical signals in the first signal path and in the second signal path are combined using a coupler 26 and the combined signal is detected by the optical receiver 28. Optionally, a portion of the combined optical signal is monitored with, for example, an optical spectrum analyzer (OSA). Detection of the combined optical signal comprises detecting an electrical signal which corresponds to the combined optical signal. This electrical signal includes a signal having a center frequency that corresponds to the RF signal applied to the frequency converter. Since the signal from the signal source 16 acts as the external stimulus for the DUT 12 and gates the measurement by the optical receiver, the optical receiver measures and displays the phase and, optionally, magnitude of the signal as a function of time. Thus, direct measurement of the phase shift in the output signal of the DUT is made as a function of the external stimulus since the time dependence of the stimulus is known.

The optical receiver may be implemented numerous ways as known in the art, such as, for example, a lightwave component analyzer (LCA), or equivalently a network signal analyzer and a calibrated photodiode. In both these examples, the analyzer includes the RF source 24. Alternatively, the optical receiver may be implemented with a calibrated photodiode combined with a vector voltmeter or vector signal analyzer to compare the detected signal with the original signal from the RF source to recover amplitude and phase information.

In one embodiment, the measurement apparatus is assembled using polarization-maintaining optical fiber. In most cases this ensures that the state of polarization (SOP) of the optical signal in both signal paths remains aligned. This is required since the strength of the signal detected by the optical receiver is a function of the degree of co-alignment of the SOPs for the two signals. However, in circumstances where, for example, a device is sensitive to the polarization of the input optical signal, and/or such fiber does not maintain alignment of the SOPs, or such fiber is not used, one or more polarization controllers can be used. For example, a polarization controller (PC) in the first path may be used to align the SOP of the optical signal with the input state of the DUT. Similarly, a polarization controller in the second path may be used to align the SOP of the optical signal with the input state of the frequency converter. A second polarization controller in the first path, at the output of the DUT, may be used to align the SOP of the signal with that of the signal in the second path.

The invention also provides a system for measuring phase change of an output optical signal from a device as a function of an external stimulus applied to the device, and includes associated components. In one embodiment the system comprises an apparatus for measuring phase change of an output optical signal from a device as described above and one or more peripheral components such as, for example, an optical signal source, a power source, a control device, a data acquisition/processing device (e.g., a microprocessor or computer), and a display device to display measurement results. In another embodiment the system is an optical communications system into which at least one apparatus for measuring phase change of an output optical signal from a device as described above is incorporated. The apparatus measures phase change of an output optical signal from a device within the system or from the entire system on an on-going, continuous basis, or on an on-demand basis (e.g., when an instruction or query is sent to the apparatus). Incorporated as such, the apparatus provides monitoring of device/system performance. The system may be distributed over a wide geographic range, in which case the one or more apparatus incorporated therein may communicate with a central control unit via any suitable means such as telemetry, the internet, or the like.

The contents all cited publications are incorporated herein by reference in their entirety.

The invention is further described by way of the following non-limiting examples.

EXAMPLE 1

The invention may be demonstrated by considering the change in the phase of the optical signal from an electro-absorption modulator (EAM) as a function of the voltage applied to the modulator, a measurement of practical interest in optical communications. However, the invention is applicable to any optoelectronic device that exhibits similar functionality: the phase of the output optical signal from the device is a function of an external stimulus (input signal) to the device (e.g., cross-phase modulation in a semiconductor optical amplifier or electroabsorption waveguide).

Figure 2:
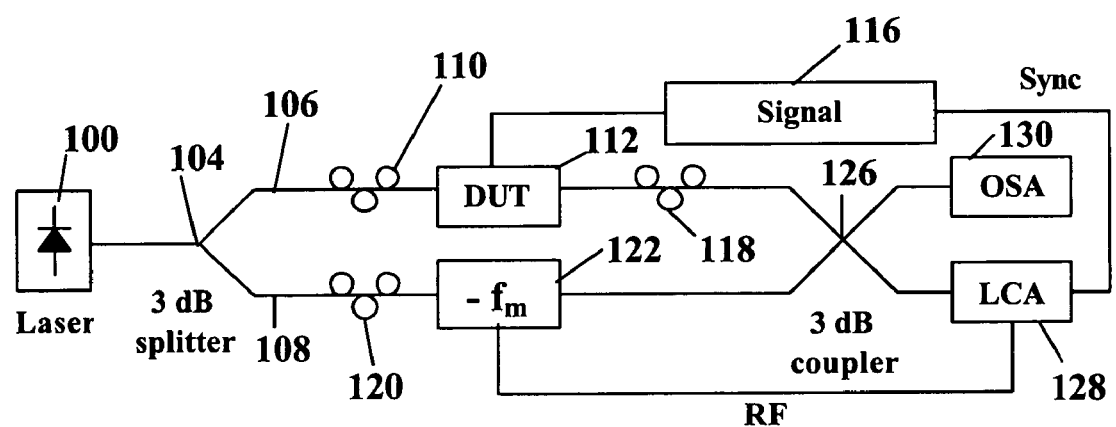
FIG. 2 is a block diagram of an apparatus according to one embodiment of the invention.

Referring to FIG. 2, an input optical signal from a laser 102 was split into first and second optical signal paths 106 and 108 by a 3 dB splitter 104. A polarization controller 110 in the first signal path was used to align the state-of-polarization (SOP) of the optical signal with the input state of the device under test (DUT) 112, i.e., the EAM. The phase and the intensity of the optical signal passing through the modulator 112 were changed by an applied voltage (V(t)) (i.e., an external stimulus) from a signal source 116, such as a waveform generator. Preferably, this external stimulus sweeps over the measurement interval of interest (e.g., the operating range of the device). The external stimulus was also used to synchronize the measurement made by an optical receiver, in this example, a lightwave component analyzer (LCA) 128. A second polarization controller 118 in the first path was used to align the state of polarization of the signal in the first path with that of the signal in the second path. This was required since the strength of the signal of interest detected by the LCA was a function of the degree of co-alignment of the SOPs for the two signals.

A polarization controller 120 in the second path aligned the SOP of the optical signal with the input state of a carrier frequency converter 122, which, in this example, was a Mach-Zehnder modulator (MZM). The MZM was biased at the extinction point and an RF signal from the LCA sinusoidally modulated the input optical signal. The MZM converted the carrier frequency of the optical signal ($f_0$) by a fixed amount ($\pm f_m$) as determined by the input RF signal from the LCA. An optical band-pass filter (OBPF) (not shown) may be used to select the upper (for carrier frequency up-conversion) or lower (for carrier frequency down-conversion) sideband of the output optical signal from the MZM. The upper sideband has a frequency of $f_0+f_m$, and the lower sideband has a frequency of $f_0-f_m$. The remainder of this example, and the following equations, relate to an embodiment in which carrier frequency down-conversion was used and the lower sideband was selected.

As shown in FIG. 2, the output optical signal in the first signal path and the changed optical signal in the second path were combined in a 3 dB coupler 126.

The electric field of the output optical signal in the first path, as a function of time, at the coupler 126 is described by $$E_{upper}(t) = A(t) \exp(j[\omega_0 t + \varnothing(t)]) \quad (3)$$

where A(t) is the amplitude of the optical signal, $\omega_0 = 2\pi f_0$ is the radian optical frequency, and $\varnothing(t)$ is the phase of the optical signal. The electric field of the changed optical signal in the second path, as a function of time, at the coupler 126 is described by $$E_{lower}(t) = B \exp(j[\omega_0 - 2\pi f_m]t) \quad (4)$$

where B is the amplitude of the optical signal (constant with time), and $f_m$ is the carrier frequency shift.

A portion of the combined light from the coupler 126 was detected by the LCA 128, and, optionally, a portion was monitored with an optical spectrum analyzer (OSA) 130.

The electric field of the optical signal incident on the LCA is the sum of equations 3 and 4 (neglecting a scaling factor)

$$E_{LCA}(t) = A(t) \exp(j[\omega_0 t + \varnothing(t)]) + B \exp(j[\omega_0 - 2\pi f_m]t). \quad (5)$$

The intensity of the optical signal incident on the LCA (neglecting a scaling factor) is $$I_{LCA}(t) = |E_{LCA}|^2 = A(t)^2 + B^2 + 2A(t)B \cos(2\pi f_m t + 526(t)). \quad (6)$$

The LCA measured the amplitude and phase of the signal at a frequency of $f_m$, the third term on the right-hand side of equation 6. Since the signal from the waveform generator acted as the external stimulus for the DUT and gated the measurement by the LCA, the LCA measured and displayed the magnitude of the signal as a function of time (i.e., A(t)B), and the phase of the signal as a function of time (i.e., $\varnothing(t)$). Thus, direct measurement of $\varnothing(t)$ was made as a function of the applied voltage since the time dependence of the applied voltage (V(t)) was known.

Figure 3:
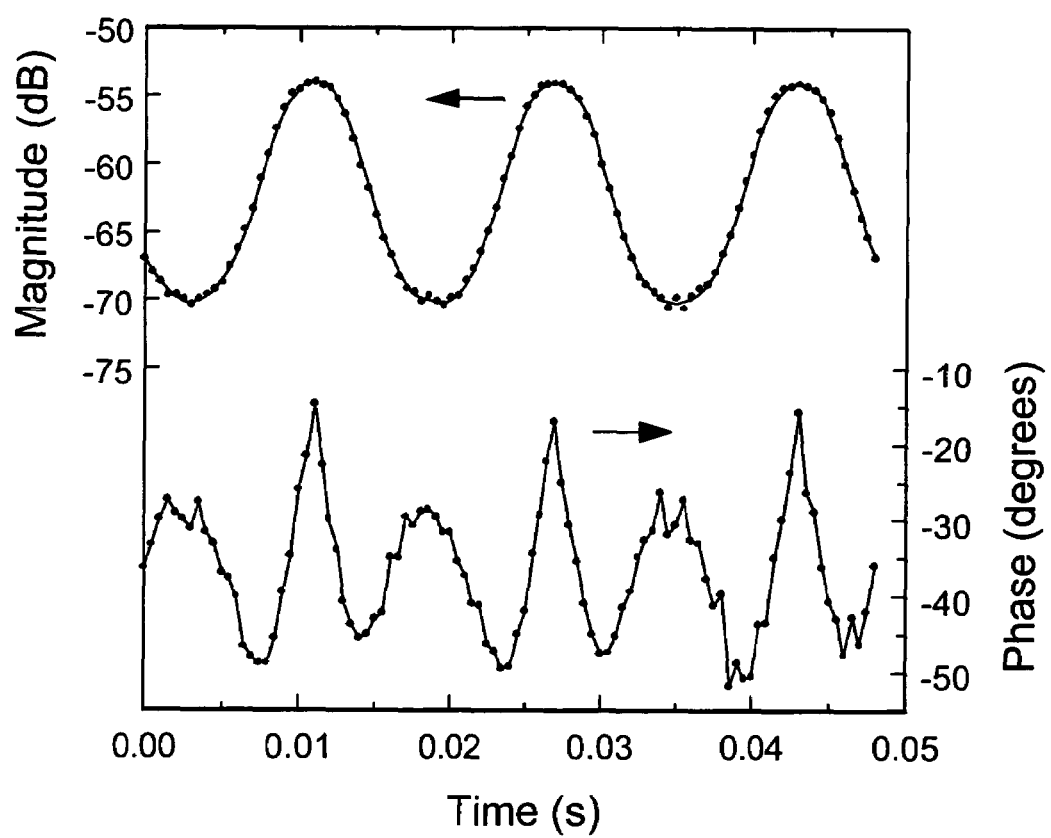
FIG. 3 is a plot of phase and amplitude traces from the lightwave component analyzer of the embodiment shown in FIG. 2.
Figure 4:
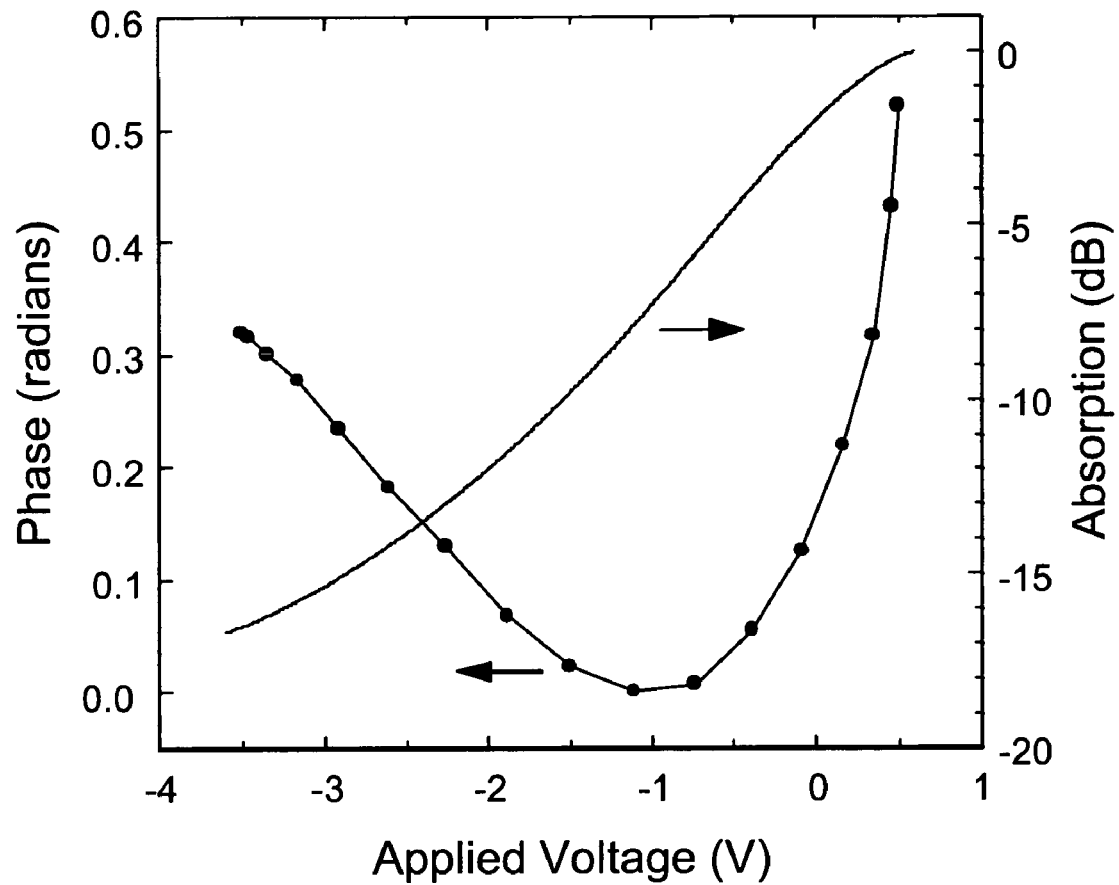
FIG. 4 is a plot showing the dependence of phase and absorption on the external stimulus applied voltage for the embodiment shown in FIG. 2.

Using fiber pigtailed components, the lengths of the two optical signal paths between the splitter 104 and the coupler 126 were matched in length to within about 10 cm. Traces from the LCA are shown in FIG. 3 for the phase $\Phi(t)$ and the amplitude A(t). The sinusoidal modulation voltage applied to the EAM from the waveform generator swung from −3.5 to 0.5 V with a frequency of 62.5 Hz. The sampling rate of the LCA yielded 32 samples/cycle. Irregularity in the phase measurement can be reduced by improving the implementation of the frequency down-converter and the stability of the interferometer. To deal with the irregular trace for the phase in this example, the data for successive periods was averaged in determining the optical phase transfer function for the EAM. The dependence of the phase and absorption on the applied voltage is shown in FIG. 4. As the applied voltage decreased from 0.5 to −3.5 V, the absorption increased by 16 dB and the phase decreased and then increased, corresponding to positive and negative chirp, respectively.

To compare the above technique with an alternative approach, the $\alpha$-parameter was calculated from the phase $\phi$ and intensity I, as determined from the absorption, using the results in FIG. 4 according to $$\alpha = 2 \frac{d\phi}{d(\ln(I))} \quad (7)$$
$$= 2 \frac{d\phi}{dV} \frac{dV}{d(\ln(I))}$$

Figure 5:
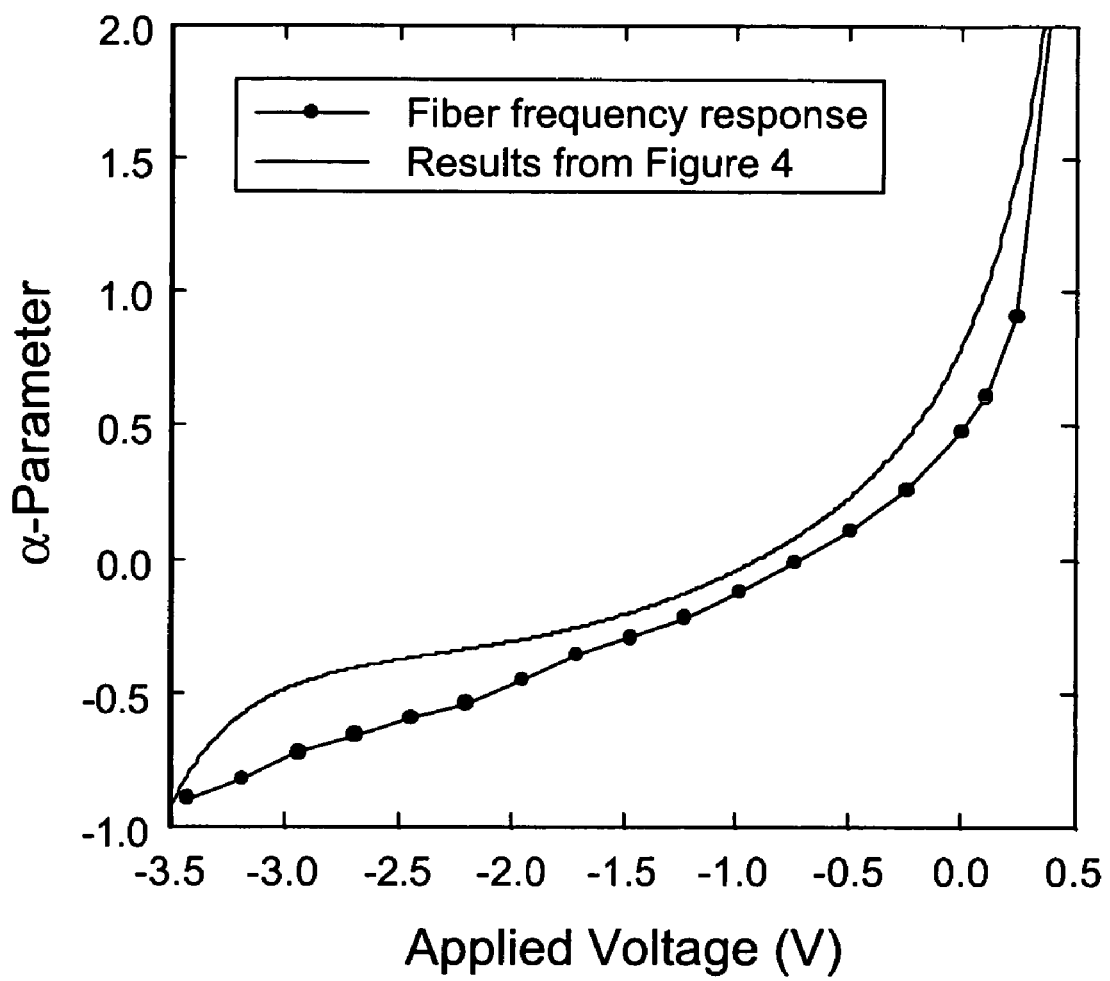
FIG. 5 is a plot of the α-parameter as a function of the external stimulus applied voltage, for the embodiment shown in FIG. 2, using results from FIG. 4 and the fiber frequency response (FFR) technique.

The $\alpha$-parameter was also determined using the fiber frequency response (FFR) technique (Devaux, et al., J. Lightwave Technol., 11:1937–1940, 1993). The results are shown in FIG. 5. The agreement is good, in spite of the sub-optimal experimental setup and measurement conditions.

EXAMPLE 2

Figure 6:
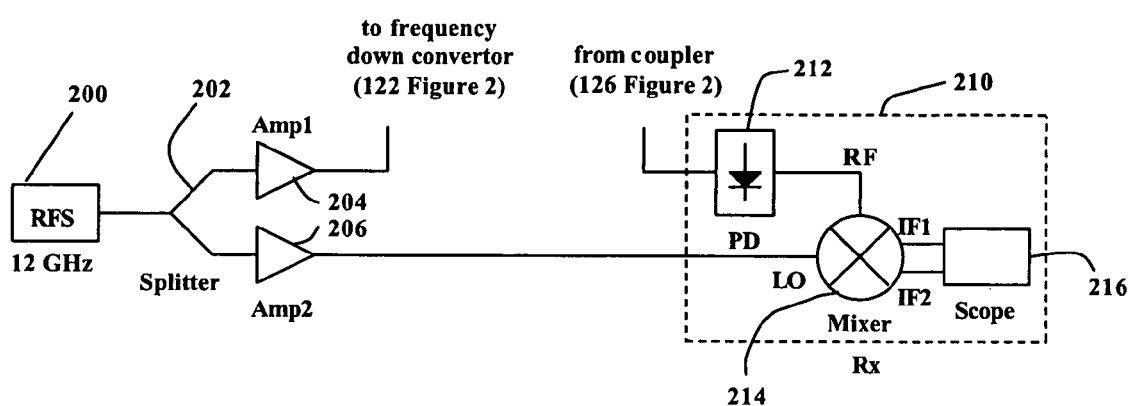
FIG. 6 is a block diagram showing an alternative embodiment of an apparatus according to the invention.

An alternative receiver was implemented to observe the change in the phase of the optical signal. In FIG. 2, the LCA 128 was replaced with the set-up shown in FIG. 6. In the set-up shown in FIG. 6, the output from a 12 GHz RF source 200 was divided into first and second paths by a 3 dB splitter 202. The first path was amplified by amplifier 204 and then fed to the frequency down converter 122 of FIG. 2, as the modulating signal. The second path was amplified by amplifier 206 and connected to the local oscillator (LO) port of a quadrature mixer 214 of the receiver 210. The output from the 3 dB coupler 126 in FIG. 2 was detected by a photodetector (PD) 212 of the receiver 210. The signal from the PD 212 was connected to the RF port of the mixer 214. The two output signals from the mixer, IF1 and IF2, were observed on an oscilloscope 216. The output signals can be represented (neglecting a scaling factor) as, $$IF_1(t) = A(t)\cos(\varnothing(t) + \theta) \quad (8)$$

$$IF_2(t) = A(t)\cos(\varnothing(t) + \theta + \pi/2) \quad (9)$$

where is θ is constant that can be taken to be zero. By solving (8) and (9) for the amplitude and phase, the change in phase of the optical signal can be determined.

Figure 7:
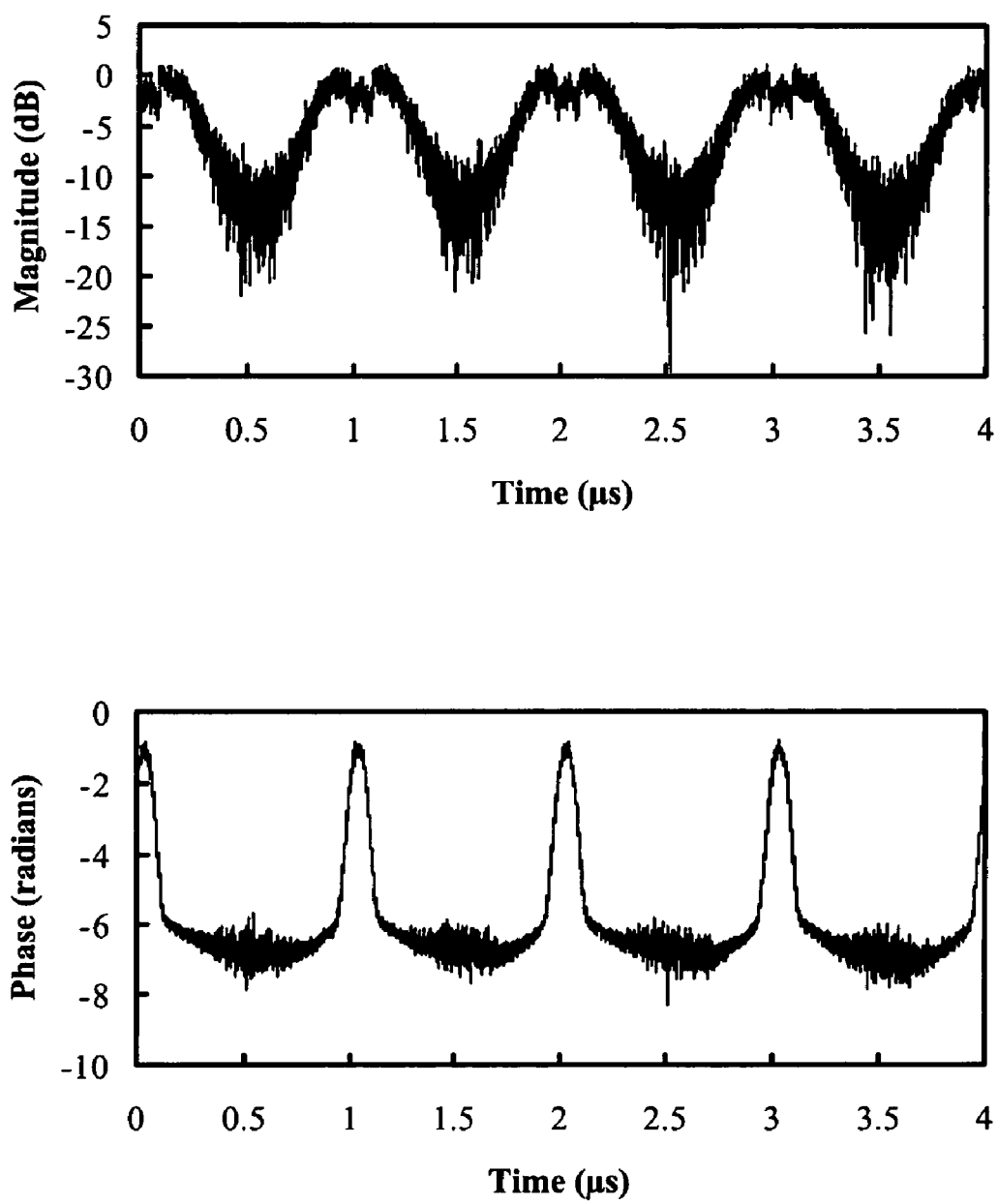
FIG. 7 is a plot of the magnitude and phase results of the embodiment of FIG. 6, using a sinusoidal voltage as the external stimulus.

An example of the magnitude and phase as a function time is shown in FIG. 7. Here, a sinusoidal voltage was applied to the EAM as the external stimulus, and the magnitude and phase were observed.

Figure 8:
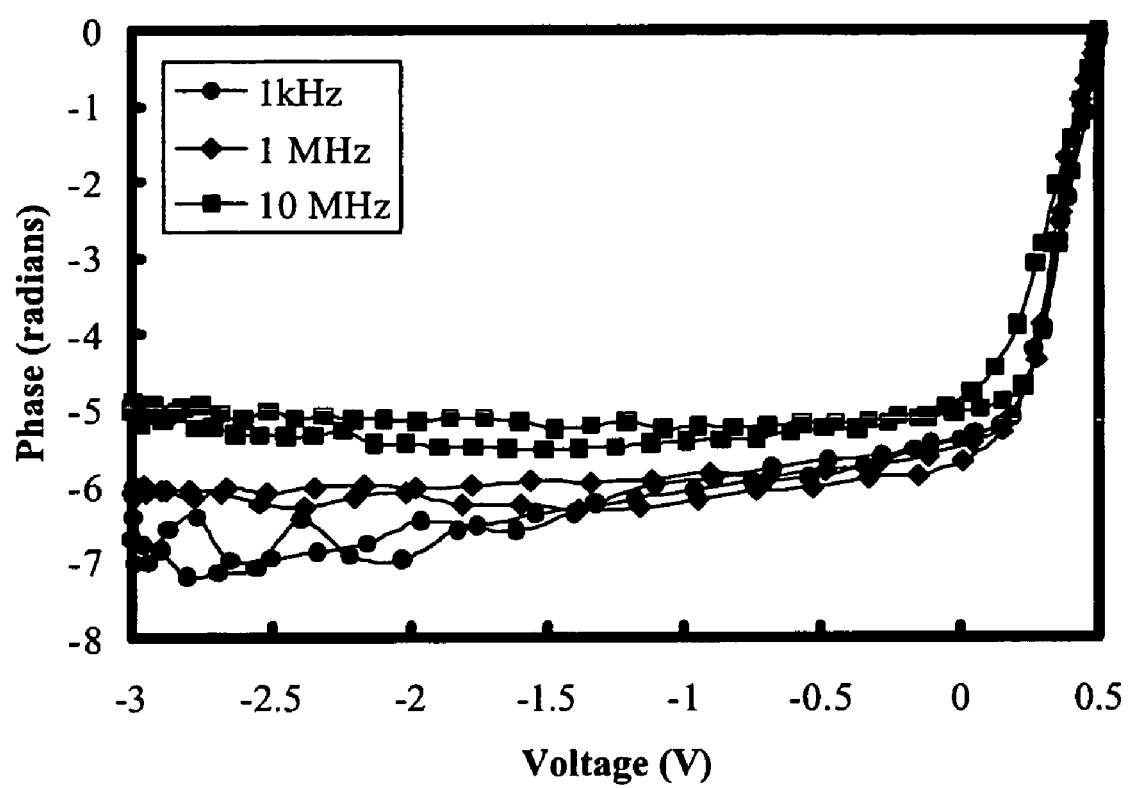
FIG. 8 is a plot of the change in phase as a function of applied voltage at three different frequencies, for the embodiment of FIG. 6.

From the observations in FIG. 7, the change in phase as a function of an external stimulus can be determined, since the time-dependence of the stimulus is known. The change in phase as a function of voltage for the EAM is shown in FIG. 8. Here, three sinusoidal voltages at different frequencies were applied to the modulator, and the change in phase observed.

Equivalents

Those skilled in the art will recognize or be able to ascertain though routine experimentation equivalents to the embodiments described herein. Such equivalents are within the scope of the invention and are covered by the appended claims.

The invention claimed is:

1. A method for measuring the phase change of an output optical signal from a device, comprising:
   splitting an input optical signal into first and second optical signals;
   passing the first optical signal through the device to produce an output optical signal;
   applying an external stimulus to the device;
   changing the carrier frequency of the second optical signal;
   combining the output optical signal and the changed second optical signal to produce a combined signal;
   detecting the combined signal in accordance with the external stimulus applied to the device;
   measuring the phase change of the output signal of the device as a function of the external stimulus applied to the device; and
   reporting the measured phase change of the output signal of the device.

2. The method of claim 1, wherein said changing the carrier frequency of the second optical signal comprises carrier frequency down-converting the second optical signal.

3. The method of claim 1, wherein said changing the carrier frequency of the second optical signal comprises carrier frequency up-converting the second optical signal.

4. The method of claim 1, further comprising measuring an amplitude change of the output signal as a function of the external stimulus applied to the device.

5. The method of claim 1, wherein the external stimulus is selected from the group consisting of electrical, optical, physical, chemical, and biological stimuli.

6. The method of claim 1, further comprising passing at least one of said first and second optical signals through at least one polarization controller.

7. The method of claim 1, wherein applying an external stimulus to the device comprises sweeping said device over its operating range.

8. The method of claim 1, further comprising using the measured phase change to evaluate performance of the device or to evaluate performance of a system in which the device is used.

9. Apparatus for measuring the phase change of an output optical signal from a device, comprising:
   a splitter that splits an input optical signal into first and second optical signals, said first signal being applied to said device;
   a converter that changes the carrier frequency of the second optical signal;
   a coupler that combines the output optical signal from the device and the changed second optical signal to produce a combined signal; and
   an optical receiver that detects the combined signal in accordance with an external stimulus applied to the device and measures the phase change of the output signal of the device as a function of the external stimulus applied to the device.

10. The apparatus of claim 9, further comprising an external stimulus source that provides said external stimulus to the device.

11. The apparatus of claim 9, wherein the external stimulus is selected from the group consisting of electrical, optical, physical, chemical, and biological stimuli.

12. The apparatus of claim 9, further comprising at least one polarization controller associated with at least one of said first and second signals.

13. The apparatus of claim 9, wherein said optical receiver also measures a change in amplitude of the output signal of the device.

14. The apparatus of claim 9, wherein said carrier frequency converter is a carrier frequency down-converter.

15. The apparatus of claim 9, wherein said carrier frequency converter is a carrier frequency up-converter.

16. A system for measuring the phase change of an output optical signal from a device comprising the apparatus of claim 9, and one or more associated components.

17. The system of claim 16, further comprising at least one member of the group consisting of an optical signal source, a power source, a control device, a data acquisition/processing device, and a display device.

18. An optical communications system comprising the apparatus of claim 9 that measures the phase change of an output optical signal from a device, and one or more associated components.

19. The system of claim 18, further comprising at least one member of the group consisting of an optical signal source, a power source, a control device, a data acquisition/processing device, and a display device.

20. An optical communications system comprising the apparatus of claim 9 that measures the phase change of an output optical signal from the system or from a device within the system.

21. The system of claim 20, further comprising at least one member of the group consisting of an optical signal source, a power source, a control device, a data acquisition/processing device, and a display device.

* * * * *